United States Patent [19]

Olsen

[11] Patent Number: 4,847,818
[45] Date of Patent: Jul. 11, 1989

[54] WRISTWATCH RADIOTELEPHONE

[75] Inventor: Fred Olsen, Oslo, Norway

[73] Assignee: Timex Corporation, Waterbury, Conn.

[21] Appl. No.: 264,758

[22] Filed: Oct. 31, 1988

[51] Int. Cl.$^4$ .......................... G04B 47/00; A44C 5/00
[52] U.S. Cl. ......................................... 368/10; 368/13; 368/282; 224/165; 379/90; 379/428
[58] Field of Search ................... 368/10, 13, 281, 282, 368/278; 379/90, 428, 440

[56] References Cited

U.S. PATENT DOCUMENTS

| | | | |
|---|---|---|---|
| 3,032,651 | 5/1962 | Jisiger-Stahli | 250/14 |
| 3,737,004 | 2/1976 | Manri | 58/152 B |
| 4,063,410 | 12/1977 | Welling | 58/38 R |
| 4,194,355 | 3/1980 | Mishida | 368/282 |
| 4,419,770 | 12/1983 | Yagi et al. | 368/10 X |
| 4,427,303 | 1/1984 | Matthias | 368/282 |
| 4,586,827 | 5/1986 | Hirsch et al. | 368/10 |
| 4,754,285 | 6/1988 | Robitaille | 343/718 |
| 4,783,800 | 11/1988 | Levine | 368/10 |

FOREIGN PATENT DOCUMENTS 59-56586 4/1984 Japan .

*Primary Examiner*—Vit W. Miska
*Attorney, Agent, or Firm*—William C. Crutcher

[57] ABSTRACT

An improved wristwatch, radiotelephone comprising a case having a timekeeping circuit a radio transceiver and a display disposed therein, a strap having a pair of strap ends connected to opposite ends of the case and adapted to be connected together for holding the case on a wearer's wrist, a microphone connected to the transceiver, a speaker connected to the transceiver, and an antenna connected to the transceiver and embedded in the strap, wherein the improvement comprises a microphone housing and a speaker housing disposed on the strap and spaced apart a sufficient distance to permit simultaneous use thereof by a user when said strap ends are not connected. Either or both of the speaker housing and microphone housing are disposed on and supported by the terminating end of a strap end and incorporate portions of the clasp. The antenna is provided by coupling through a filter circuit to a pair of audio leads connecting the transceiver to either or both of the speaker and microphone.

14 Claims, 4 Drawing Sheets

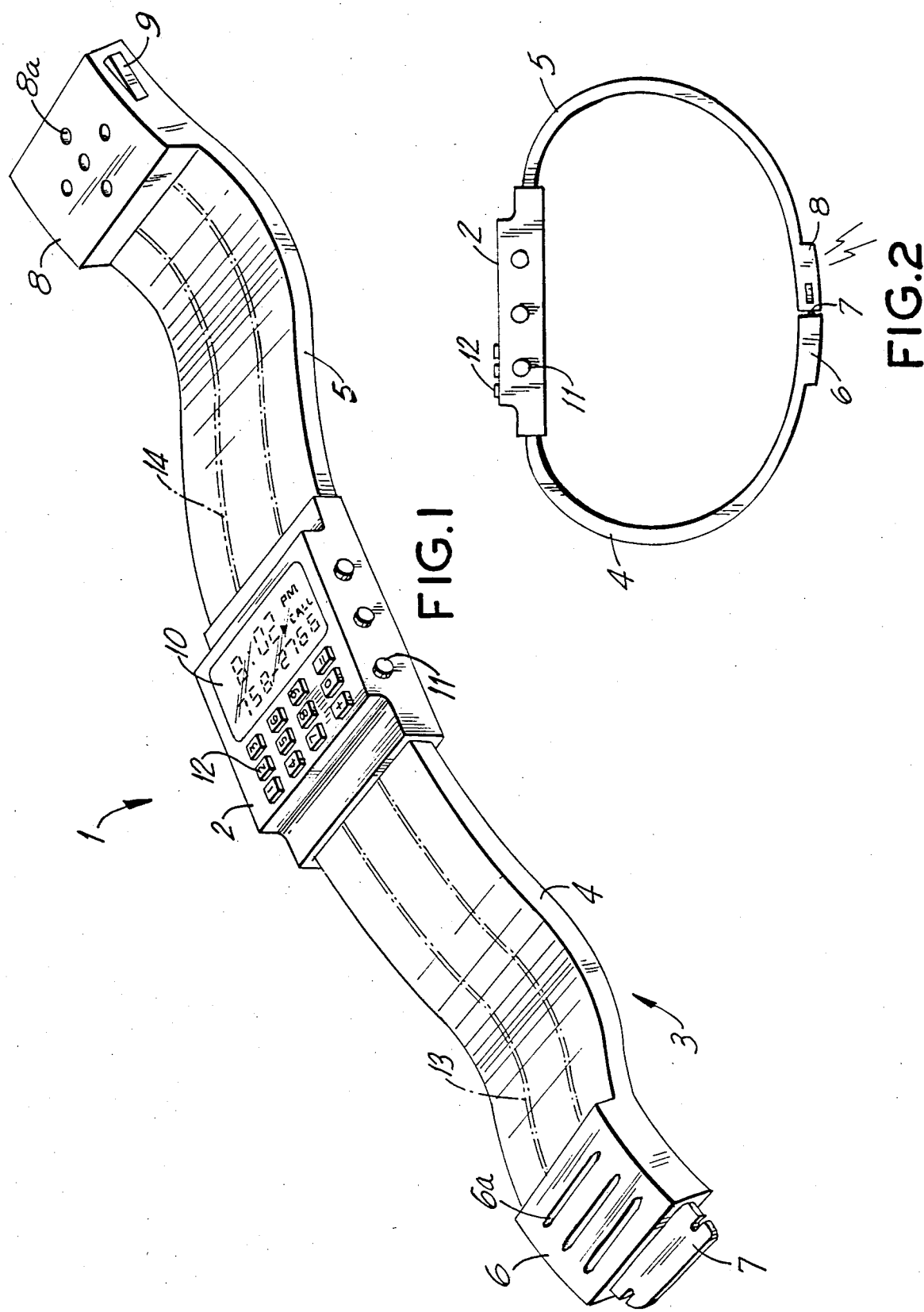

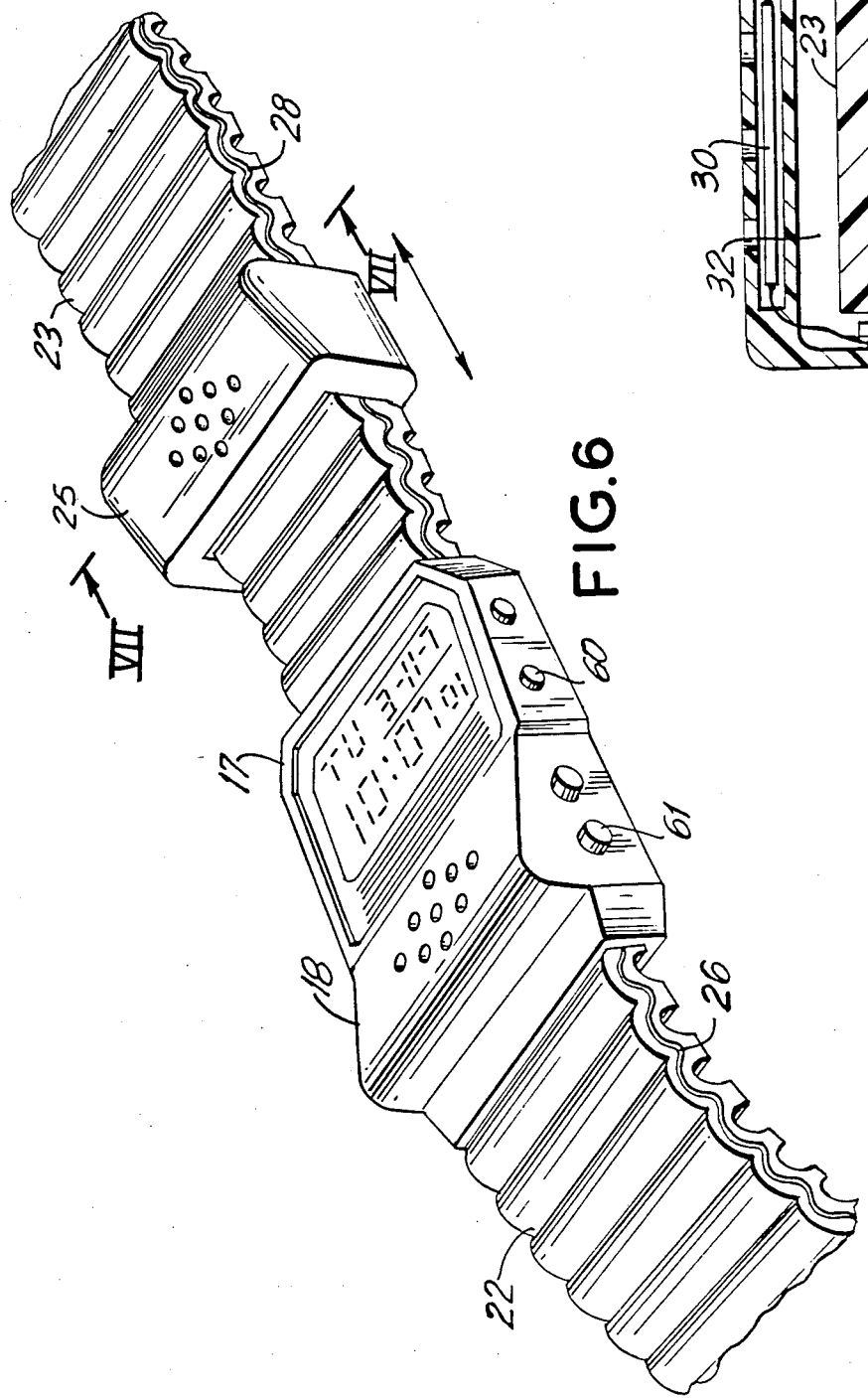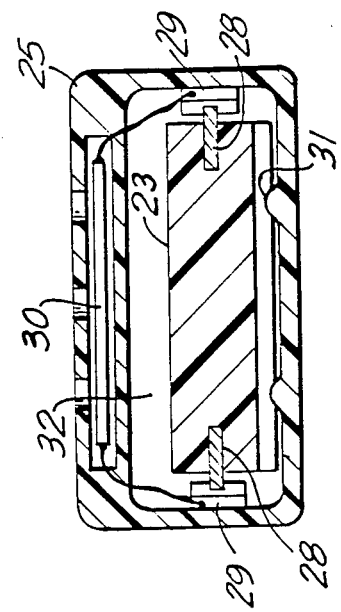

WRISTWATCH RADIOTELEPHONE

BACKGROUND OF THE INVENTION

This invention relates generally to wrist instruments including timekeeping devices and more particularly to an improved wristwatch radiotelephone.

The circuitry, network switching equipment and techniques for linking mobile radiotelephones to communications networks are highly developed. Also miniaturization of radiotelephones and their components have taken place in both paging receivers and in data communications transmitters. The requirements of a minimum space between a telephone mouthpiece and an earpiece and the need to support the device with the hand has led to a more or less standard accepted conventional shape for a telephone handset, be it for a desk unit or a portable wireless telephone. In some case, folding units have been used, as disclosed, for example in U.S. Pat. No. 4,471,493 - Schober, which incorporates a self-contained dipole antenna in a hinged cover a radiotelephone remote unit.

An example of miniaturized circuitry for portable or mobile transceivers which might be used in a cellular-type radio telephone system is disclosed in U.S. Pat. No. 4,486,624 - Puhl, et al, assigned to Motorola, the disclosure of which is incorporated herein by reference. Major components are a microphone, a speaker, a keyboard, a display, an antenna, a power supply, switches a microprocessor, and other circuitry and components necessary to interface and interconnect the components.

It is well known to integrate the components of an electronic timepiece with a radio receiver as shown in U.S. Pat. No. 3,937,004 - Natori, issued Feb. 10, 1976, or to integrate a digital watch with a transmitter as disclosed in U.S. Pat. No. 4,063,410 - Welling, issued Dec. 20, 1977, or to incorporate the antenna for either a transmitter or a receiver into a wristwatch band as disclosd in U.S. Pat. No. 4,754,285 - Robitaille, issued June 28, 1988, and assigned to the present assignee. It is also known to interconnect modules such as a battery container or keyboard to a wristwatch casing where the modules, such as a battery container or keyboard are spaced from the casing on a strap and connected thereto by conductors embedded within the strap, typical constructions being disclosed in U.S. Pat. No. 4,194,355 - Nishida, issued March 25, 1980, and U.S. Pat. No. 4,427,303 - Matthias, issued Jan. 24, 1984, or in U.S. Pat. No. 4,586,827 -Hirsch, et al, issued May 6, 1986.

None of the foregoing constructions offer any solution to the problem of simultaneous usage of the earphone and mouthpiece in a wristwatch radiotelephone. U.S. Pat. No. 3,032,651 - Jisiger - Stahli, et al, discloses a wrist-carried radio set with antenna and loudspeaker embedded in the attachment strap, wherein the loudspeaker may be used also as a microphone, but presumably not at the same time that it is used as a loudspeaker. Japanese published Utility Model 59-56586, discloses a wristwatch radio receiver with a receptacle embedded in one strap end for receiving a connection jack for an earphone which may be used while the wrist instrument is still attached to the wrist.

It would be desirable to have a mobile radiotelephone to be easily carried on the person and used as a wristwatch when it is not needed as a telephone. It would also be desirable to provide a miniaturized portable telephone which could be carried on the person without taking up room in clothing, purse or briefcase.

Accordingly, one object of the present invention is to provide an improved wristwatch radiotelephone.

Another object of the invention is to provide an improved miniaturized radio telephone which can be carried on the wrist and used for other purposes such as a timepiece.

SUMMARY OF THE INVENTION

Briefly stated, the invention comprises an improved wristwatch radiotelephone comprising a case having a timekeeping circuit and a time display therein, a strap having a pair of strap ends connected to opposite ends of the case and adapted to be connected together for holding the case on a wearer's wrist, a radio transceiver disposed in the case, a microphone connected to the transceiver, a speaker connected to the transceiver, an antenna connected to the transceiver and embedded in at least one strap end, wherein the improvement comprises a speaker housing and a microphone housing, said housings being disposed on and supported by said strap and spaced from one another by a sufficient distance to permit simultaneous use thereof by a user when said strap ends are not connected. Preferably, either or both of the speaker housing and microphone housing are associated with the clasp at the ends of the strap ends where they are connected together. The antenna may be provided by audio leads connecting the transceiver with the speaker or microphone by use of a suitable filter circuit.

DRAWING

Other objects and advantages of the invention will be more clearly understood by reference to the following description, taken in connection with the accompanying drawings, in which:

FIG. 1 is a perspective view of a wristwatch radiotelephone,

FIG. 2 is an elevation view of the wristwatch radiotelephone of FIG. 1 with the strap ends connected for use as a wristwatch.

FIG. 6 is a perspective view of a portion of the FIG. 5 embodiment,

FIG. 7 is a cross-section taken in a plane through a portion of FIG. 6, looking in the direction of arrows VII—VII.

DESCRIPTION OF THE PREFERRED EMBODIMENT

Figure 3:
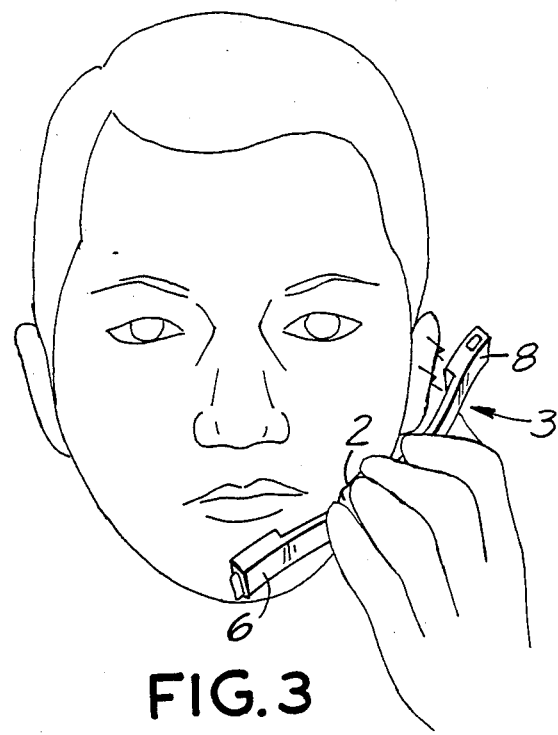
FIG. 3 is a simplified drawing of the wristwatch radio telephone of FIG. 1 when it is being used as a telephone.

Referring to FIGS. 1, 2 and 3 of the drawing, the improved wristwatch radiotelephone shown generally as 1 includes a case 2 adapted to be held on the wrist by a strap 3. Strap 3 comprises a pair of strap ends, 4 and 5 of flexible insulating material such as injection-molded ABS or polyurethane plastics. Strap end 4 terminates in an integrally molded microphone housing 6 with an extending tab 7. Strap end 5 similarly terminates in, an integral speaker housing 8, having a slot on its far end (not shown) adapted to receive clasp 7 and a spring-loaded tab release lever 9. Microphone housing 6 has opening 6a to allow sound of the voice to enter and actuate a microphone, not shown, which may be of the piezoelectric type or the electret type or the dynamic type. Speaker 8 similarly has holes 8a to allow sound to emanate from the speaker (not shown) which may be of the piezoelectric, or dyanmic type.

The case 2 is preferably injection-molded of insulating plastics such as polycarbonate or polyacetal, and contains a timekeeping circuit (not shown), a display 10, and a series of actuating push buttons such as 11 to activate and deactivate the radiotelephone as well as to perform timekeeping functions such as setting the time of day. The upper part of the case 2 further incorporates a keypad of dialing push buttons 12, preferably arranged in the manner of a standard telephone keyboard. Case 2 also contains a conventional miniaturized radio transceiver designed to provide two-way mobile telephone communication, details of which are well known to those skilled in the art, and a power supply.

A pair of conductors 13 embedded in strap end 4 serve as audio leads to connect the microphone to the transceiver in case 2. Similarly, a pair of conductors 14 embedded in strap end 5 serve as audio leads to connect the speaker in housing 8 to the transceiver in case 2. Each pair of conductors 13, 14 is also suitably coupled to the transceiver through an isolation circuit to serve as a dipole antenna. Conductors 13, 14 may either be overmolded in an injection-molded process, or they may be laminated between molded strap layers with or without an adhesive.

The material of strap 3 is formulated to cause it to be relatively stiff and attached to case 2 in such a manner that the strap ends 4 and 5 will extend away from the case and support housing 6 and 8 when the wristwatch is held at the center of the case. At the same time, the strap 3 is flexible and deformable enough to be attached around the wrist. Stiffness may also be imported by using spring material to make conductors 13 and 14 which are inside strap 3, or by including a layer of stiff plastic.

Reference to FIG. 2 of the drawing, shows the wristwatch radiotelephone of FIG. 1 as it is worn on the wrist, with the clasp components of the two housings 6 and 8 connected. In this mode, it normally functions as a wristwatch. However, it may also be activated with buttons 11 to receive paging signals through radio transmissions utilizing a preselected protocol and sounding a paging signal through the speaker in housing 8. The speaker may also alternatively be utilized to provide a conventional audio alarm signal for an alarm watch, thereby conserving space used by the normal piezoelectric alarm generator in the conventional alarm watch.

Reference to FIG. 3 of the drawing illustrates the improved wristwatch radiotelephone in use as a telephone. The stiffness of strap 3 serves to support housing 6 and 8 and properly space the microphone housing 6 from the speaker housing 8, so as to permit simultaneous use of the microphone and speaker when the strap ends are not connected. Case 2 provides a handle to hold the instrument and allows operation of push button actuators. The strap material is formulated or provided with stiffness so as to be flexible enough to go around the wrist, but stiff enough so that it will hold the microphone housing and the speaker housing in properly spaced and oriented positions.

Figure 4:
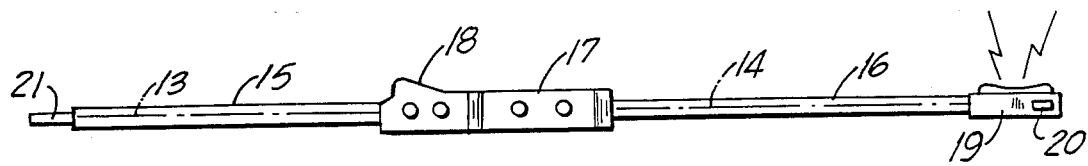
FIG. 4 is a side elevation view of a modified wristwatch radiotelephone.

A modified form of the invention is seen in FIG. 4, wherein strap ends 15 and 16 incorporate embedded conductor pairs 13, 14 as before, serving as a dipole antenna. The strap ends are connected on opposite ends of a case 17 which also has an extension 18 serving as a microphone housing for the microphone. The terminating end of strap end 16 includes an integrally molded speaker housing 19, which also includes a clasp tab receptacle and a clasp tab release 20. The terminating end of the other strap end 15 has a tab 21 similar to that of FIG. 1. When the wrist instrument of FIG. 4 is removed from the wrist, it is operated in the same manner as shown in FIG. 3 with the strap end 16 serving to space the microphone housing 18 from the speaker housing 19 by a sufficient distance to permit simultaneous use of the microphone and the speaker when the strap ends are not connected. The conductors 14 connect the speaker in housing 19 to the transceiver in case 17, serving as audio leads.

Figure 5:
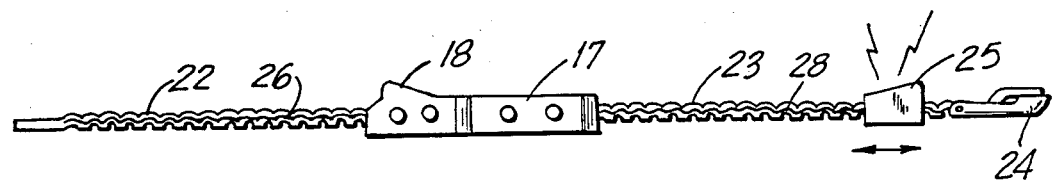
FIG. 5 is a side elevation view of a further modification of the FIG. 4 embodiment.

FIG. 5 illustrates a modified form of FIG. 4. Case 17 and microphone housing 18 are as previously described. However, the strap comprises a buckle strap having a strap end 22 with conventional tongue and holes, and a strap end 23 with a conventional buckle 24. In this arrangement, the speaker housing 25 is adjustable along the strap end 23 in order to adjust the space between housing to suit the user. The housing 25 is also adapted to serve as a "keeper" for the tongue of strap end 22 after it passes through buckle 24 when the watch is fastened around the wrist. Springy serpentine conductors for the dipole antenna seen at 26, 28 are embedded in the strap ends to provide support for housing 25 as before, and also serve as sliding audio connectors between the speaker and the transceiver.

Reference to FIGS. 6 and 7 of the drawing shows further details of the FIG. 5 modification. The case 17 and microphone housing 18 are molded as a single member and contain the aforementioned timekeeping circuit and radio transceiver, together with a microphone. Push button actuators such as 60 perform timekeeping fuctions and push button actuators such as 61 perform radiotelephone functions. The device shown in FIG. 6 has no keypad and is dedicated to specified communication frequencies which may be selected by push buttons 29.

As shown in the drawing, the strap ends 22 and 23 are molded of insulating material in an undulating shape and have the serpentine conductive metal strips 26, 28 molded into opposite edges thereof. Strips 26, 28 provide spring flexibility along with the desired stiffness and also have edges extending slightly beyond the edge of the strap material as seen in FIG. 7.

In accordance with the present embodiment, the speaker housing is adapted to be adjusted along strap end 23 to the proper spacing from the microphone housing 18. The speaker housing consists of a hollow molded loop member with internal spring loaded sliding contacts 29, contacting the edges of conductive strips 28. The slide contacts 29 are electrically connected to a piezoelectric or other speaker 30. Internal bumps 31 allow the housing 25 to be positioned on strap end 23 at the proper spacing from microphone housing 18. It remains to note that a clearance or spacing 32 is provided to receive the tongue of strap end 22 so that the adjustable microphone housing can also act as a strap tongue keeper when the wristwatch is buckled on the wrist.

Figure 8:
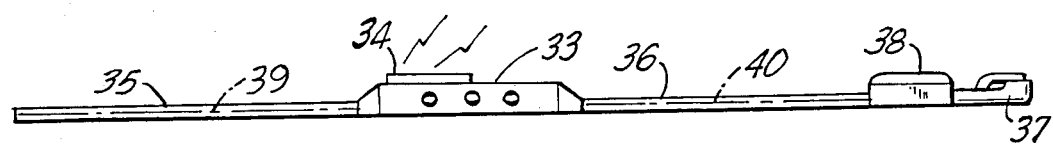
FIG. 8 is an elevation view of yet another modification of the invention.

FIG. 8 of the drawing illustrates another modification which reverses the arrangements shown in FIGS. 4–7. A case 33 enclosing the previously described timekeeping circuit, radio transceiver, display and power supply also incorporates a speaker housing 34 and is supported on a buckle-type strap having a strap end 35 terminating in a tongue, and a strap end 36 terminating in a buckle 37. A microphone housing 38 is disposed on the strap end 36 adjacent buckle 37. Housing 38 may either by molded as part of the strap end termination, or may be constructed as part of buckle 37 and adapted for attachment to the strap end. Flexible conductors 39, 40 are embedded in the strap, either by injection molding the strap material around the conductor, or by laminating the conductors between two premolded strap layers which are attached to one another by adhesive. Conductors 39, 40 comprise a dipole antenna. Conductors 40 also serve as audio leads to connect the microphone in housing 38 to the transceiver contained in case 33.

Figure 9:
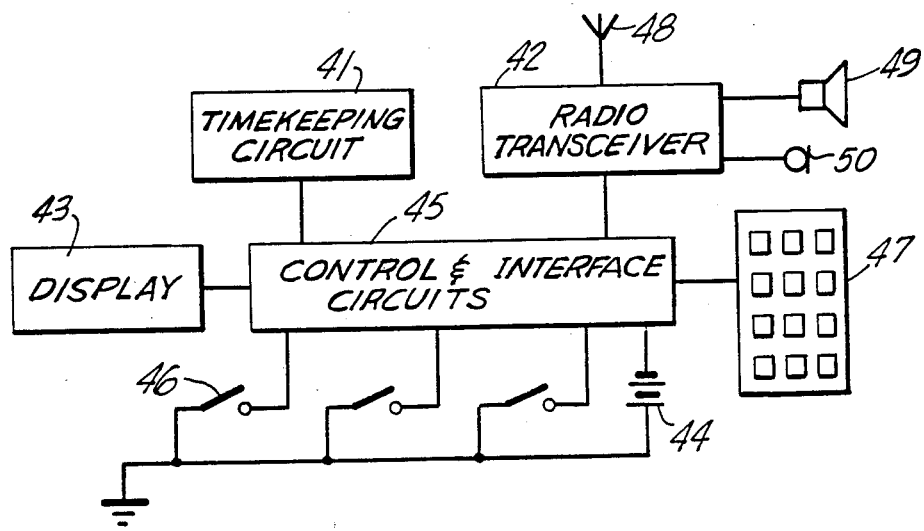
FIG. 9 is a simplified schematic drawing of major components.

FIG. 9 is a simplified schematic view of the major components contained within the case and within the two housings which are omitted in FIG. 9. The components contained in the case are a timekeeping circuit 41, a radio transceiver 42, a display 43, power supply 44, and control and interface circuits indicated at 45. In actual practice timekeeping circuit 41 and control and interface circuit 45 would be part of a single integrated circuit or microcomputer. Manually actuated switches such as 46 are disposed on the case to control the operation of the wristwatch timekeeping circuit, as well as to activate and select operational modes of the radio transceiver 42. A telephone dialing keypad 47 may either be arranged on the case as shown in FIG. 1 or in some cases may be separated therefrom and carried on the strap as a separate component as suggested in the aforementioned U.S. Pat. No. 4,194,355. Connected to the radio transceiver are a dipole antenna 48 which is arranged in the strap as previously described, a speaker 49 which is disposed in a speaker housing as previously described, and a microphone 50 which is disposed in a spaced microphone housing as previously described.

Figure 10:
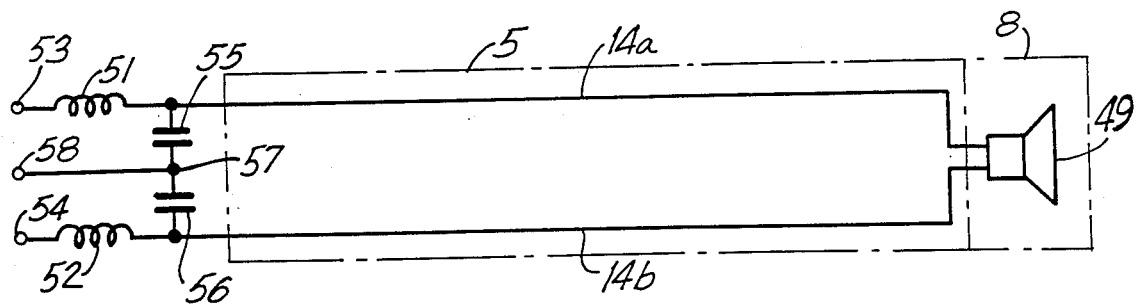
FIG. 10 is a portion of a cricuit illustrating use of the speaker and/or microphone leads as part of the antenna.

FIG. 10 is a circuit drawing illustrating how the conductor pair serving as audio leads connecting the speaker (or microphone) to the transceiver are coupled to the antenna output terminal so that the leads serve as half of a dipole antenna. The conductor pair carrying the low frequency audio signal to speaker 49 in housing 8 comprise conductors 14a and 14b embedded in strap end 5, which are connected through RF choke coils 51, 52 to audio output terminals 53, 54 respectively of the transceiver. A pair of capacitors 55, 56 are connected in series between conductors 14a, 14b, and a junction 57 between capacitors 55 and 56 is connected to an antenna output terminal 58 of the transceiver. The capacitor 55, 56 and chokes 51, 52 serve as a filter circuit to couple the RF signal to both of conductors 14a, 14b, while permitting the separate conductors 14a, 14b to serve as audio leads to speaker 49.

While there has been described what considered herein to be the preferred embodiment of the invention and modifications thereof, it is desired to secure in the appended claims all such modifications as fall within the true spirit and scope of the invention.

I claim:

1. An improved wristwatch radiotelephone comprising a case having a timekeeping circuit, a radio transceiver and display disposed therein, a strap having a pair of strap ends attached to opposite ends of said case and adapted to be attached together for holding said case on a wearer's wrist, a microphone connected to said transceiver, a speaker connected to said transceiver, and a flexible antenna including conductor means embedded in said strap and connected to said transceiver, wherein the improvement comprises a speaker housing for said speaker and a microphone housing for said microphone, said housings being disposed on said strap and spaced from one another by a sufficient distance to permit simultaneous use thereof when said strap ends are not connected.

2. The improvement according to claim 1, wherein said speaker housing and said microphone housing are disposed on respective terminating ends of said strap ends opposite the point where said strap ends are attached to said case.

3. The improvement according to claim 2, wherein said housings are integral molded portions of said strap ends.

4. The improvement according to claim 2, wherein said housings include cooperating clasp means for connecting them together to hold said case on a wearer's wrist.

5. The improvement according to claim 1, wherein said microphone housing is formed as an extension of said case, and wherein said speaker housing is disposed on a first strap end.

6. The improvement according to claim 5, wherein said speaker housing is disposed on the end of said first strap end and incorporates means for connection to a second strap end.

7. The improvement according to claim 5, wherein said speaker housing is slidably disposed on said first strap and includes contact means connected to said speaker and slidably engaging said conductor means in said strap.

8. The improvement according to claim 7, wherein said and second strap ends terminate in buckle and tongue connections, respectively, and wherein said microphone housing is adapted to serve as a keeper for said tongue.

9. The improvement according to claim 1, wherein said speaker housing is formed as an extension of said case, and wherein said microphone housing is disposed on the terminating end of one of said strap ends.

10. The improvement according to claim 1, wherein said strap includes means imparting sufficient stiffness thereto to support at least one of said housings when the strap ends are not connected.

11. The improvement according to claim 10, wherein said stiffness imparting means comprises said conductor means being formed of springy metal.

12. The improvement according to claim 10, wherein said strap is formed of layers in a laminated construction, and wherein said stiffness imparting means is a layer of plastics material interposed between other of said layers.

13. The improvement according to claim 1, wherein said conductor means comprises a pair of conductors extending between said case and one of said housings, and including filter means connected in circuit with said conductors near said transceiver to permit said pair of conductors to serve both as antenna and as audio leads.

14. The combination according to claim 1, wherein said conductor means comprises a pair of conductors in each of said strap ends arranged and adapted to serve both as antenna for said transceiver and as audio leads between the transceiver and at least one of said speaker and said microphone.

* * * * *